United States Patent Office 3,036,499
Patented May 29, 1962

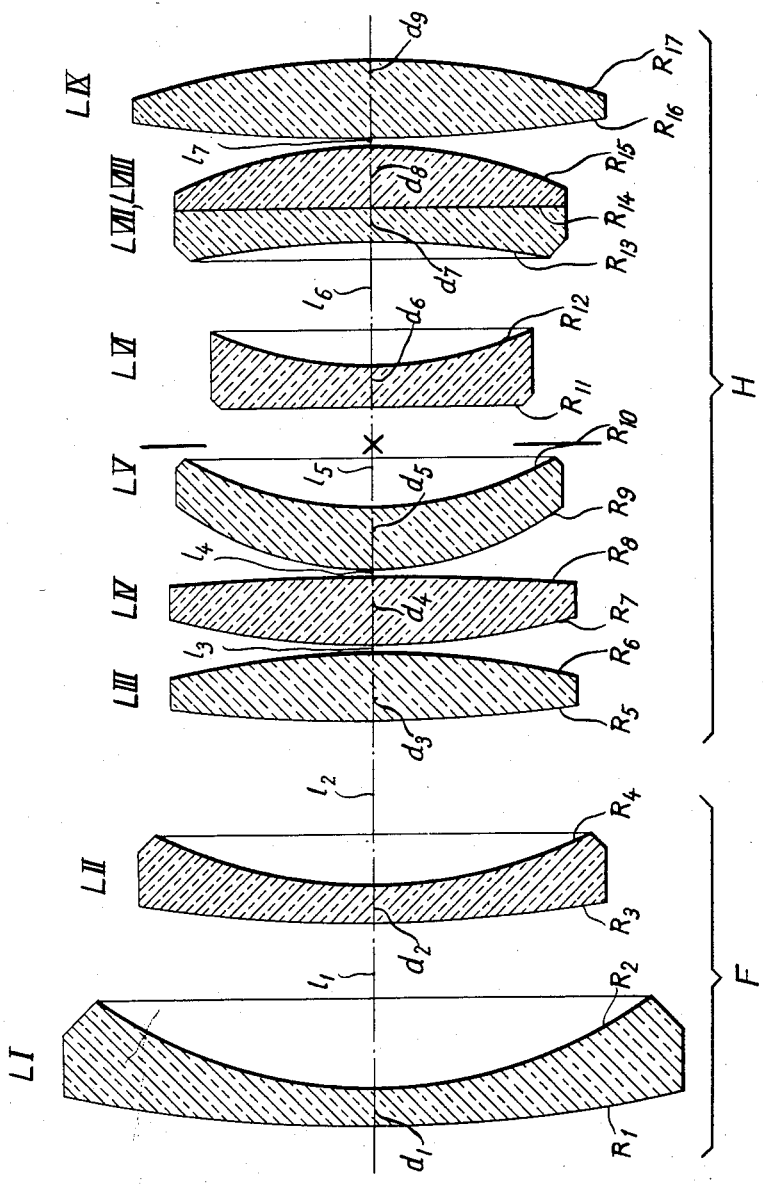
May 29, 1962    J. LAUTENBACHER    3,036,499
PHOTOGRAPHIC WIDE-ANGLE OBJECTIVE OF
EXTREMELY HIGH LIGHT INTENSITY
Filed Dec. 30, 1958
INVENTOR:
JOHANN LAUTENBACHER
by
Mestern & Kollin
ATTORNEYS

3,036,499
PHOTOGRAPHIC WIDE-ANGLE OBJECTIVE OF
EXTREMELY HIGH LIGHT INTENSITY
Johann Lautenbacher, Munich, Germany, assignor to
Enna-Werk Optische Anstalt Dr. Appelt K.G., Munich,
Germany
Filed Dec. 30, 1958, Ser. No. 783,895
Claims priority, application Germany Sept. 12, 1958
1 Claim. (Cl. 88—57)

This invention relates to a photographic objective whose usable picture area is larger than the focal length of the objective and whose relative opening is at least 1:2.0, whereby the intercept length at the image side is more than 0.8 times the focal length of the objective. The objective consists of a frontal part which preferably is composed of two menisci having negative power of refraction and of a principal part having positive power of refraction, composed of several lenses. The latter has a distance of at least 0.1 times the focal length of the objective whereby the total length of the objective does not exceed three times the focal length.

The object of the present invention is the creation of a photographic wide-angle objective having a picture angle of more than 60° at an extreme aperture ratio of at least 1:2.0 which has an intercept length at the image side corresponding at least to the focal length of the objective. This arrangement facilitates particularly the installation of the objective in special devices, such as in single-objective reflex cameras. The entire length of the objective, however, must not be more than three times the focal length. Only if all these conditions are maintained, the lenses as well as the pertinent mechanisms can be fabricated in such a manner that a practical objective for a picture format of 24 x 36 mm. and larger is obtained.

Objectives of the above description to date are known only with a smaller aperture ratio.

Investigations have shown that the above-described objective can be manufactured without losing the good picture effect attained in some other objectives. This will now be further illustrated with reference to the figure of the accompanying drawing.

Referring to that drawing, the frontal group of positive lenses $L_3$, $L_4$, $L_5$ of the objective main part H, between the frontal part F and the lens having the strongest negative power of refraction $L_6$, consists in the entire system of at least three lenses having positive power of refraction, wherein the positive lens $L_5$, disposed nearest the negative lens $L_6$ has, at most, 0.4 times the power of refraction of the two preceding positive lenses, and wherein simultaneously the positive power of refraction exerted between the negative lens $L_6$ and the image plane is distributed over at least two positive lenses. Furthermore, it is advantageous that the power of refraction of the surface of the negative lens $L_6$ which faces away from the image side has at the most one-quarter the negative power of refraction of that lens, and that the two adjacent positive lenses (facing the image side and the objective side, respectively) are shaped in form of menisci. This facilitates overcoming largely the spherical aberrations even for the extreme aperture without diminishing the extra-axial correction because the negative power of refraction required for removal of the extra-axial errors is distributed correspondingly and is disposed in such a manner as to favor correction.

Since the peripheral rays of the zero-degree cone of rays penetrate all areas between approximately 0.95 times and 1.5 times the height of entry, it furthermore is of advantage to impart to all radii a curvature which is more than two-thirds the focal length of the entire system.

In a cone of rays of such size, the removal of chromatic aberrations is difficult. It therefore is recommended, according to the present invention, to split the meniscus at the image side adjacent to the negative lens $L_6$, or to provide it with a cemented surface and to manufacture the negative part $L_7$ of meniscus of a glass whose $v$-value is at most 0.7 times that of the positive lens $L_8$ of this meniscus. This facilitates a favorable division of the divergent action of the negative power of refraction in the main system.

Moreover, it is preferable, according to the present invention, to have the arithmetical mean of the indices of refraction (relative to the $d$-line) of the lenses of positive power of refraction $L_8$ and $L_9$ between negative lens $L_6$ and the picture area at least 0.05 times as large as the arithmetical mean of the indices of refraction of the positive lens group $L_3$, $L_4$, $L_5$ between the frontal part F and the negative lens $L_6$. This not only decreases the spherical aberration but also has a favorable action upon the inclined cones of rays.

In Table 1, a preferred embodiment is listed giving the construction data of a wide-angle objective according to the present invention as illustrated in the accompanying drawing.

The several lenses are denoted $L_1$, $L_2$, etc., the radii of the lenses $R_1$, $R_2$, etc., $d_1$, $d_2$, etc. is the thickness of the lenses along their optical axes, the air spaces between the individual lenses are noted as $l_1$, $l_2$, etc., the indices of refraction are $n_1$, $n_2$, etc., and the Abbé indices are $v_1$, $v_2$, etc.

*Table 1*

[Aperture relationship 1:2.0. Focal length: 100 mm.]

| Radii of Curvature | Thicknesses and Separations | Index of Refraction | Dispersion Ratio or Abbé number |
|---|---|---|---|
| $R_1 = +250.0$ | $d_1 = 7.0$ | $n_1 = 1.51821$ | $v_1 = 65.18$ |
| $R_2 = +85.0$ | $l_1 = 30.0$ | | |
| $R_3 = +270.0$ | $d_2 = 7.0$ | $n_2 = 1.51821$ | $v_2 = 65.18$ |
| $R_4 = +92.0$ | $l_2 = 30.0$ | | |
| $R_5 = +350.0$ | $d_3 = 12.0$ | $n_3 = 1.58921$ | $v_3 = 40.97$ |
| $R_6 = -172.0$ | $l_3 = 1.0$ | | |
| $R_7 = +156.0$ | $d_4 = 12.0$ | $n_4 = 1.62280$ | $v_4 = 56.88$ |
| $R_8 = -600.0$ | $l_4 = 1.0$ | | |
| $R_9 = +58.0$ | $d_5 = 12.0$ | $n_5 = 1.52249$ | $v_5 = 59.64$ |
| $R_{10} = +74.0$ | $l_5 = 18.0$ | | |
| $R_{11} = \infty$ | $d_6 = 8.0$ | $n_6 = 1.78472$ | $v_6 = 25.71$ |
| $R_{12} = +71.0$ | $l_6 = 21.0$ | | |
| $R_{13} = -185.0$ | $d_7 = 6.0$ | $n_7 = 1.78472$ | $v_7 = 25.71$ |
| $R_{14} = \infty$ | $d_8 = 11.0$ | $n_8 = 1.69100$ | $v_8 = 54.80$ |
| $R_{15} = -89.0$ | $l_7 = 1.0$ | | |
| $R_{16} = +300.0$ | $d_9 = 14.0$ | $n_9 = 1.69100$ | $v_9 = 54.80$ |
| $R_{17} = -150.2$ | | | |

I claim as my invention:
A photographic wide angle objective having the following charactertistics:

[Aperture relationship 1:2.0. Focal length: 100 mm.]

| Radii of Curvature | Thicknesses and Separations | Index of Refraction | Dispersion Ratio or Abbé number |
|---|---|---|---|
| $R_1 = +250.0$ | | | |
| | $d_1 = 7.0$ | $n_1 = 1.51821$ | $v_1 = 65.18$ |
| $R_2 = +85.0$ | | | |
| | $l_1 = 30.0$ | | |
| $R_3 = +270.0$ | | | |
| | $d_2 = 7.0$ | $n_2 = 1.51821$ | $v_2 = 65.18$ |
| $R_4 = +92.0$ | | | |
| | $l_2 = 30.0$ | | |
| $R_5 = +350.0$ | | | |
| | $d_3 = 12.0$ | $n_3 = 1.58921$ | $v_3 = 40.97$ |
| $R_6 = -172.0$ | | | |
| | $l_3 = 1.0$ | | |
| $R_7 = +156.0$ | | | |
| | $d_4 = 12.0$ | $n_4 = 1.62280$ | $v_4 = 56.88$ |
| $R_8 = -600.0$ | | | |
| | $l_4 = 1.0$ | | |
| $R_9 = +58.0$ | | | |
| | $d_5 = 12.0$ | $n_5 = 1.52249$ | $v_5 = 59.64$ |
| $R_{10} = +74.0$ | | | |
| | $l_5 = 18.0$ | | |
| $R_{11} = \infty$ | | | |
| | $d_6 = 8.0$ | $n_6 = 1.78472$ | $v_6 = 25.71$ |
| $R_{12} = +71.0$ | | | |
| | $l_6 = 21.0$ | | |
| $R_{13} = -185.0$ | | | |
| | $d_7 = 6.0$ | $n_7 = 1.78472$ | $v_7 = 25.71$ |
| $R_{14} = \infty$ | | | |
| | $d_8 = 11.0$ | $n_8 = 1.69100$ | $v_8 = 54.80$ |
| $R_{15} = -89.0$ | | | |
| | $l_7 = 1.0$ | | |
| $R_{16} = +300.0$ | | | |
| | $d_9 = 14.0$ | $n_9 = 1.69100$ | $v_9 = 54.80$ |
| $R_{17} = -150.2$ | | | | and wherein $R_1$ to $R_{17}$ are the radii of the refracting lens surfaces;
$d$ is the thicknesses and separations;
$l$ is the separation;
$n$ is the index of refraction;
$v$ is the dispersion ratio or Abbé number; and
$f$ is the focal length of the objective.

References Cited in the file of this patent

UNITED STATES PATENTS

| | | |
|---|---|---|
| 2,341,385 | Kingslake et al. | Feb. 8, 1944 |
| 2,612,077 | Albrecht | Sept. 30, 1952 |
| 2,649,022 | Angenieux | Aug. 18, 1953 |
| 2,772,601 | Bertele | Dec. 4, 1956 |
| 2,821,112 | Lautenbacher et al. | Jan. 28, 1958 |
| 2,824,495 | Klemt | Feb. 25, 1958 |
| 2,826,117 | Mukai | Mar. 11, 1958 |
| 2,844,997 | Lange | July 29, 1958 |
| 2,969,713 | Mukai | Jan. 31, 1961 |